United States Patent
Sharma et al.

(10) Patent No.: US 7,711,820 B2
(45) Date of Patent: May 4, 2010

(54) HIGH AVAILABILITY FOR INTELLIGENT APPLICATIONS IN STORAGE NETWORKS

(75) Inventors: Samar Sharma, San Jose, CA (US); Rahul Chari, Santa Clara, CA (US); Sanjaya Kumar, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1577 days.

(21) Appl. No.: 10/984,195

(22) Filed: Nov. 8, 2004

(65) Prior Publication Data

US 2006/0168192 A1    Jul. 27, 2006

(51) Int. Cl.
*G06F 15/173* (2006.01)
*G06F 15/16* (2006.01)
*G06F 11/00* (2006.01)

(52) U.S. Cl. .................... 709/226; 709/209; 714/4
(58) Field of Classification Search .......... 714/4; 709/223, 209, 226
See application file for complete search history.

(56) References Cited

U.S. PATENT DOCUMENTS 7,036,051 B1 *  4/2006 Fernandes .................... 714/55
7,127,633 B1 * 10/2006 Olson et al. ................... 714/4

OTHER PUBLICATIONS

Ottem, Erik, "Storage Area Networks: Providing High-Availability Storage for Cluster Environments", Dell™, Mar. 2002, printed Aug. 2, 2005, pp. 1-6.

* cited by examiner

*Primary Examiner*—Paul H Kang
(74) *Attorney, Agent, or Firm*—Weaver Austin Villeneuve & Sampson LLP

(57) ABSTRACT

Methods and apparatus provide formation and management of intelligent application clusters in a storage area network. Disk arbitration mechanisms ensure that a cluster is owned by a single member. In the event of a network partition, each cluster member involved arbitrates to gain ownership of a cluster. High availability mechanisms allow monitoring of system resources and effective failover capabilities.

14 Claims, 15 Drawing Sheets

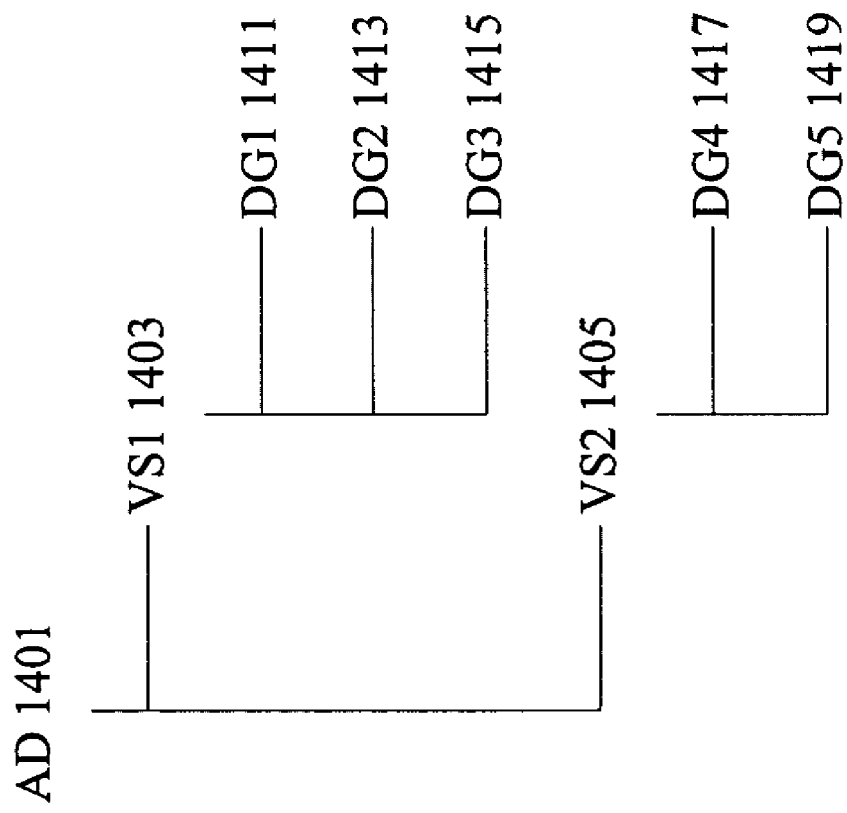

HIGH AVAILABILITY FOR INTELLIGENT APPLICATIONS IN STORAGE NETWORKS

BACKGROUND OF THE INVENTION

1. Field of the Invention

The present invention generally relates to storage area networks. More specifically, the present invention provides high availability and system management capabilities for applications in storage area networks.

2. Description of Related Art

In many storage area networks, high availability is provided either by hosts or end devices. For example, a storage device may have multiple disks that include redundancy, striping and mirroring features. A host writes data to a disk array and the disk array is responsible for managing redundancy features in a manner transparent to the host. In another example, hosts may be responsible for implementing various features. Instead of having an end device perform the redundancy operations, a host can elect to mirror and stripe data across a variety of storage devices in a storage area network.

With the emergence of intelligent storage area networks, applications such as volume management, virtualization, and remote replication are being moved to the network. In some examples, fibre channel switches in a storage area network perform functions associated with these applications in a manner transparent to the hosts and end devices. However, mechanisms for making services provided by the applications highly available and easily manageable are limited.

Consequently, it is desirable to provide techniques to improve the management and high availability features of storage area network switch based applications.

SUMMARY OF THE INVENTION

Methods and apparatus provide formation and management of intelligent application clusters in a storage area network. Disk arbitration mechanisms ensure that a cluster is owned by a single member. In the event of a network partition, each cluster member involved arbitrates to gain ownership of a cluster. High availability mechanisms allow monitoring of system resources and effective failover capabilities.

In one embodiment, a method for providing high availability at a virtual logical unit number server (VS) is provided. A heartbeat timeout is detected between a first VS and a second VS in a service-group cluster. The first VS has a first VS write region. The second VS has a second VS write region. The first VS and the second VS share an ownership region. An identifier associated with the first VS is written into a first VS write region when it is determined that the second VS write region is clear. The ownership region is written when it is determined that the ownership region is clear. The first VS is operated as the standalone master VS upon writing the ownership region.

In another embodiment, a virtual logical unit number server (VS) is provided. The VS includes a resource manager, an arbitration module, a heartbeat module, and a state manager. The resource manager is configured to manage multiple disk groups coupled to the VS. The arbitration module is configured to ensure data integrity in case of connectivity loss between the VS and a standby VS. The heartbeat module is configured to trigger actions upon heartbeat timeout. The state manager is coupled to the resource manager, the heartbeat module, and the arbitration module. The state manager is configured to synchronize configuration information between the VS and the standby VS.

In yet another embodiment, a method for configuration change synchronization is provided. A configuration request is received from a user at an active virtual logical unit number server (VS). A telnet control protocol (TCP) connection request is sent to a standby VS. Configuration information is sent to the standby VS. Configuration update information is stored at the active VS and at the standby VS. A configuration success message is sent to the user.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIGS. 14a and 14b are diagrammatic representations showing configuration of service-groups.

DETAILED DESCRIPTION OF SPECIFIC EMBODIMENTS

Figure 1:
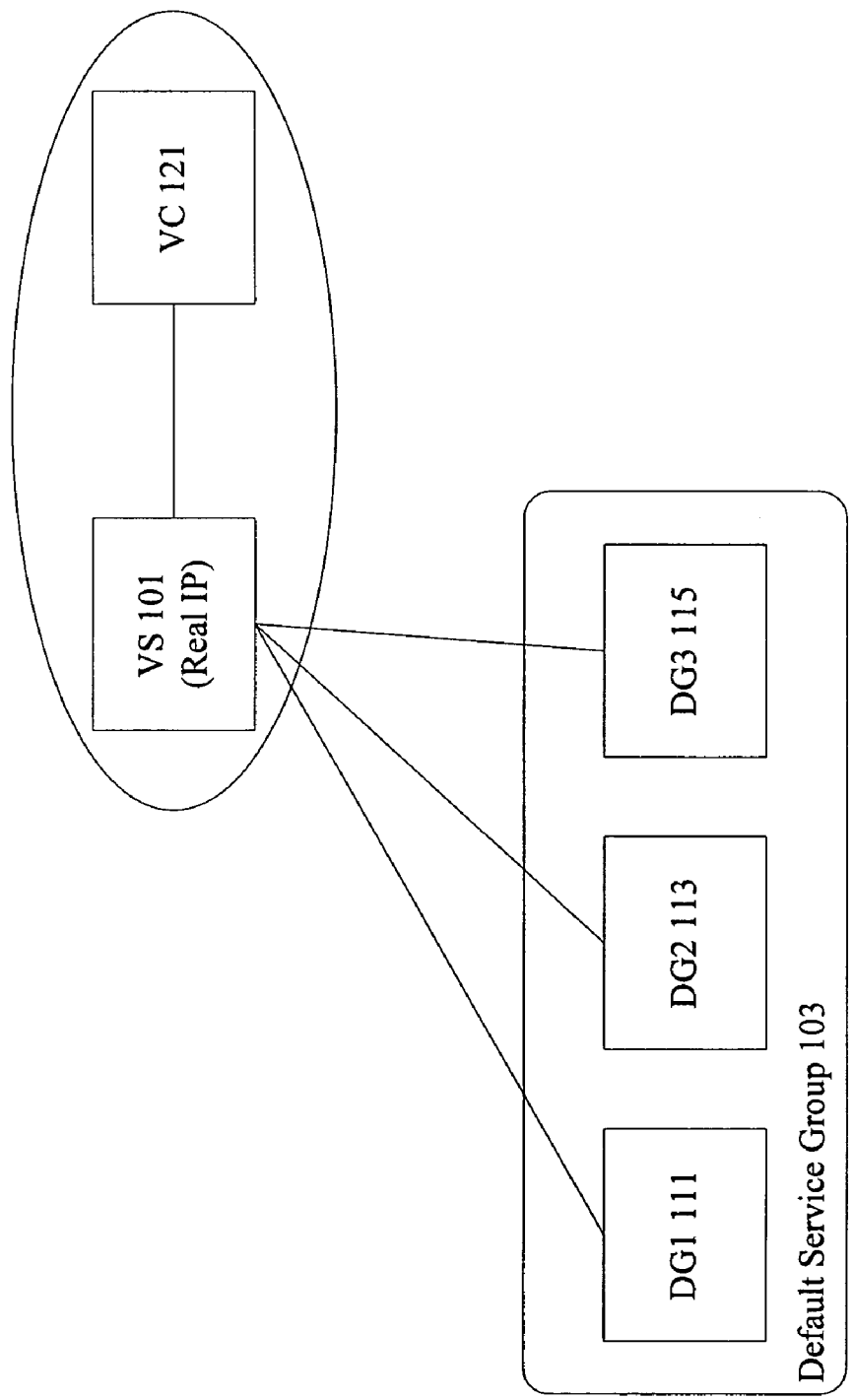
FIG. 1 is a diagrammatic representation showing a system having a single VLUN server (VS).

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fibre channel networks. However, it should be noted that the techniques of the present invention can be applied to different variations and flavors of fibre channel. In the following description, numerous specific details are set forth in order to provide a thorough understanding of the present invention. The present invention may be practiced without some or all of these specific details. In other instances, well known process operations have not been described in detail in order not to unnecessarily obscure the present invention. Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Intelligent storage area networks allow network switches to run management applications to control storage devices, provide virtualization, and allow for remote replication. In conventional systems, management applications are run at end devices or at host devices. For example, a disk array would be responsible for striping and mirroring data across multiple disks. In another example, a host would provide for volume management.

Providing management applications on a network is an efficient and transparent way to provide a variety of services. However, having a variety of services on the network may require that the services provided remain undisturbed by hardware or network failures. Applications are often made redundant through clustering. However, clustering applications to provide high availability is often a challenging task. A storage area network uses logical unit numbers (LUNs) to distinguish between storage resources. For example, users can determine whether a LUN is a disk drive, a number of disk drives, or a partition on a disk drive. Virtual logical unit numbers (VLUNs) allow more efficient organization of storage resources. For example, a VLUN can be made up of complex Redundant Array of Independent Disks (RAID) layouts and even span across heterogeneous storage.

According to various embodiments, the virtual ports that expose the same LUN to host applications are controlled by a centralized entity in the fabric. Having a centralized entity provides consistency when the LUN is being accessed simultaneously by multiple hosts. Any mechanism that owns VLUNs is referred to herein as a VLUN server (VS). In many examples, a VS serves VLUN configuration information to various clients, manages and allocates disk resources, creates/deletes/modifies VLUNs, and manages metadata on the disks.

Since a VLUN is accessible from a host only if the VS is active, the techniques of the present invention provide mechanisms for making the VS highly available. According to various embodiments, each active VS has a standby VS per resource. The redundant VS pair shares a virtual IP address. The active VS owns and responds to the virtual IP address until it fails, at which point the standby VS takes over the virtual IP address. Ensuring data integrity across failovers is typically an important requirement of VS redundancy. VS high availability ensures that at any point of time at most one VS controls a disk-group. Having more than one VS control a disk-group can result in data corruption.

FIG. 1 is a diagrammatic representation showing one example of a system having a single VS. VS 101 has a default service group 103. The default service group 103 includes disk groups 111, 113, and 115. The default service group 103 is not highly available and does not have any standby VS associated with it. If a disk-group is not explicitly assigned to a service group, it belongs to the default service group 103. The default service group 103 is associated with the real IP address of the VS 101. All the VLUNs in the default service group are accessible to a VLUN client (VC) 121 through the real IP address of the VS 101.

Figure 2:
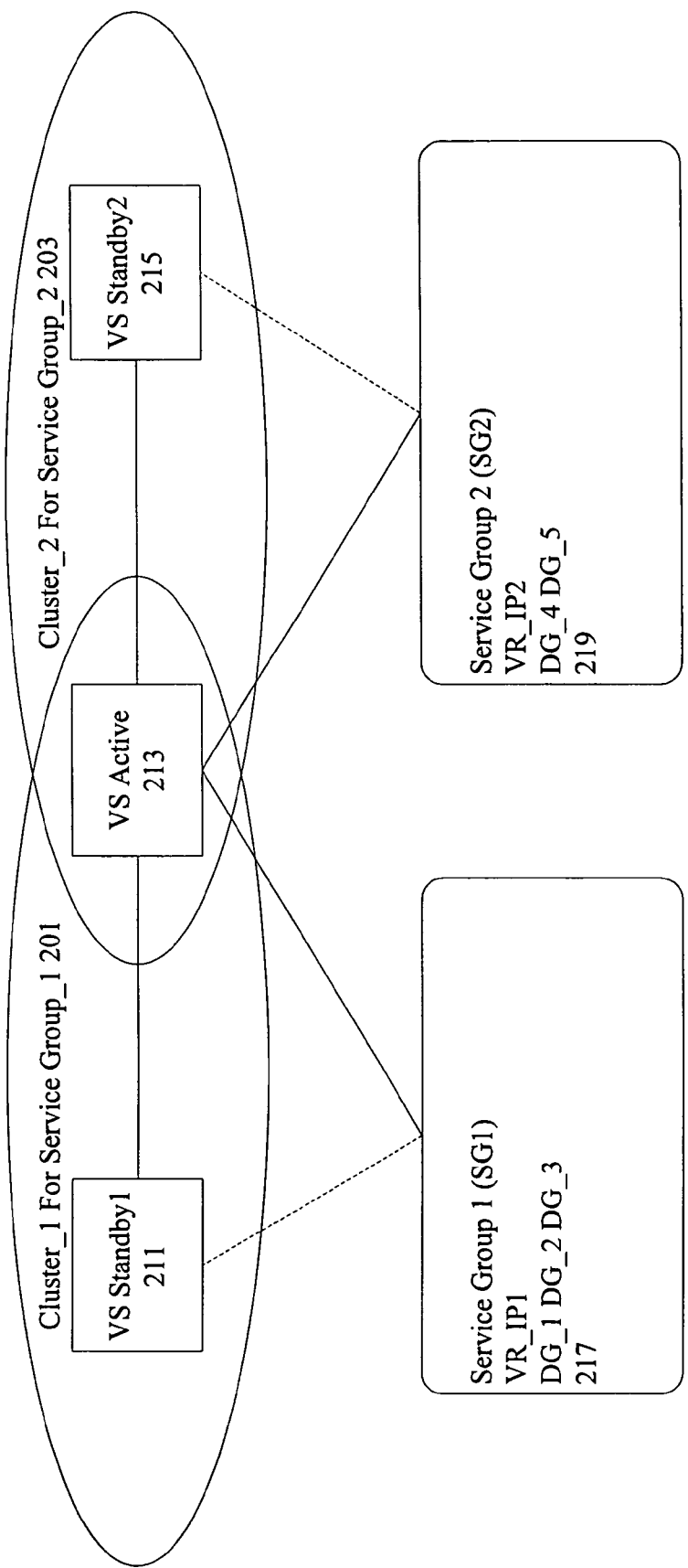
FIG. 2 is a diagrammatic representation showing a system having redundant VS.

FIG. 2 is a diagrammatic representation showing one example of a system having an active VS and a standby VS. According to various embodiments, a standby VS 211 is provided for service group 217 and a standby VS 215 is provided for service group 219. Each service group is associated with a virtual IP address. The standby VS 211 and the standby VS 215 backup active VS 213. A VC connects to the VS 213 on the Virtual IP address of the service group to which the accessed disk groups belong. A VS 213 has a virtual IP address for each service group it is controlling. According to various embodiments multiple overlapping two-node clusters can arise. Ideally a VS should not be configured as the standby VS for too many service groups.

Service group 219 may failover to VS 215 because of a variety of reasons. In one example, there may be a link failure between VS 213 and VS 215. In another example, the active VS 213 may lose connectivity to one or more disk-groups in the service-group 219 and hence relinquishes control of the service-group 219.

In either case, the disk-groups in service-group 219 move to standby VS 215. However service group 217 remains in the control of active VS 213. It should be noted that there may be multiple heartbeats between two VLUN servers if they are the active-standby pair for more than one service group.

When two nodes in a cluster are unable to communicate with each other due to a link failure or some other reason that prevents one node from receiving messages from the other, the condition is called a network partition or a Split-Brain condition. In a redundancy cluster without multiple heartbeat channels, a network partition cannot be distinguished from a node failure simply by the loss of heartbeats. But the action on heartbeat time-out must ensure that data integrity is maintained in either case. According to various embodiments, solutions to the problem can be classified as protocol based approaches and resource fencing approaches.

One example of a protocol based approach would be a quorum mechanism in which shared resources cannot be used without the agreement of the majority of the nodes in the cluster. However, this uses an odd number of nodes in the cluster if the voting members for the quorum are the cluster members. Another approach would be to use a centralized arbitrator such as a disk to decide the cluster master.

In resource-based fencing, a hardware mechanism is employed which immediately disables or disallows access to shared resources. If the shared resource is a Small Computer Systems Interface (SCSI) disk or disk array, SCSI reserve/release can be used. If the shared resource is a fibre channel disk or disk array, then the fibre channel switch can be instructed to deny the problem node access to shared resources. In both cases of failure, a link failure or a node failure, data corruption should not be possible. At any given time, only one VS can be the Active VS for a service-group. According to various embodiments, the techniques of the present invention use a protocol based arbitration approach where both the VLUN servers are used to participate in a protocol to ensure that data integrity is maintained.

In some examples, each VS owns a "Write Region", per service-group. Each write region can be one block in size. According to various embodiments, both the active and standby VS for a service group are aware of each other's write region. In addition to the write regions for the VLUN Servers in the service-group cluster, each service group also has an Ownership Block. Hence for a two-node cluster, the number of disk blocks used per service-group is three, with two Write Regions and one Ownership Block.

If the current Active VS for a service-group is in the Standalone Master state, the ownership block of the service-group includes the ID of the Active VS. If the current Active VS for a service-group is in the Cluster Master state, the ownership block for the service group is clear. This ensures that in the case of a network partition, both the VLUN Servers can attempt to establish service-group ownership.

If the write region of a VS holds no ID it is said to be clear. According to various embodiments, arbitration proceeds as follows:

1. Each VS reads the write region of the other VS in the service-group cluster.
2. If the write region of the other VS is clear:
  a. The VS writes its own ID in its write region
  b. The VS then reads the write region of the other VS again.
  c. If the write region of the other VS is still clear:
    The VS has control of the Ownership block.
    The VS reads the Ownership block.
    If the Ownership block has its own ID or is clear:
      The VS writes its ID in the Ownership block
      The VS clears its own write region
      The VS moves to the standalone Master state for the service-group. (End of Arbitration)
    If the Ownership block has the ID of the other VS, this VS moves to the isolated state for the service-group. (End of Arbitration)
  d. If the write region of the other VS is not clear:
    The VS clears its write region and backs off.
    It waits for a random amount of time (in ms) and starts the arbitration protocol all over again.
3. If the write region of the other VS is not clear, the VS moves to the isolated state for the service-group. (End of Arbitration)

Figure 3:
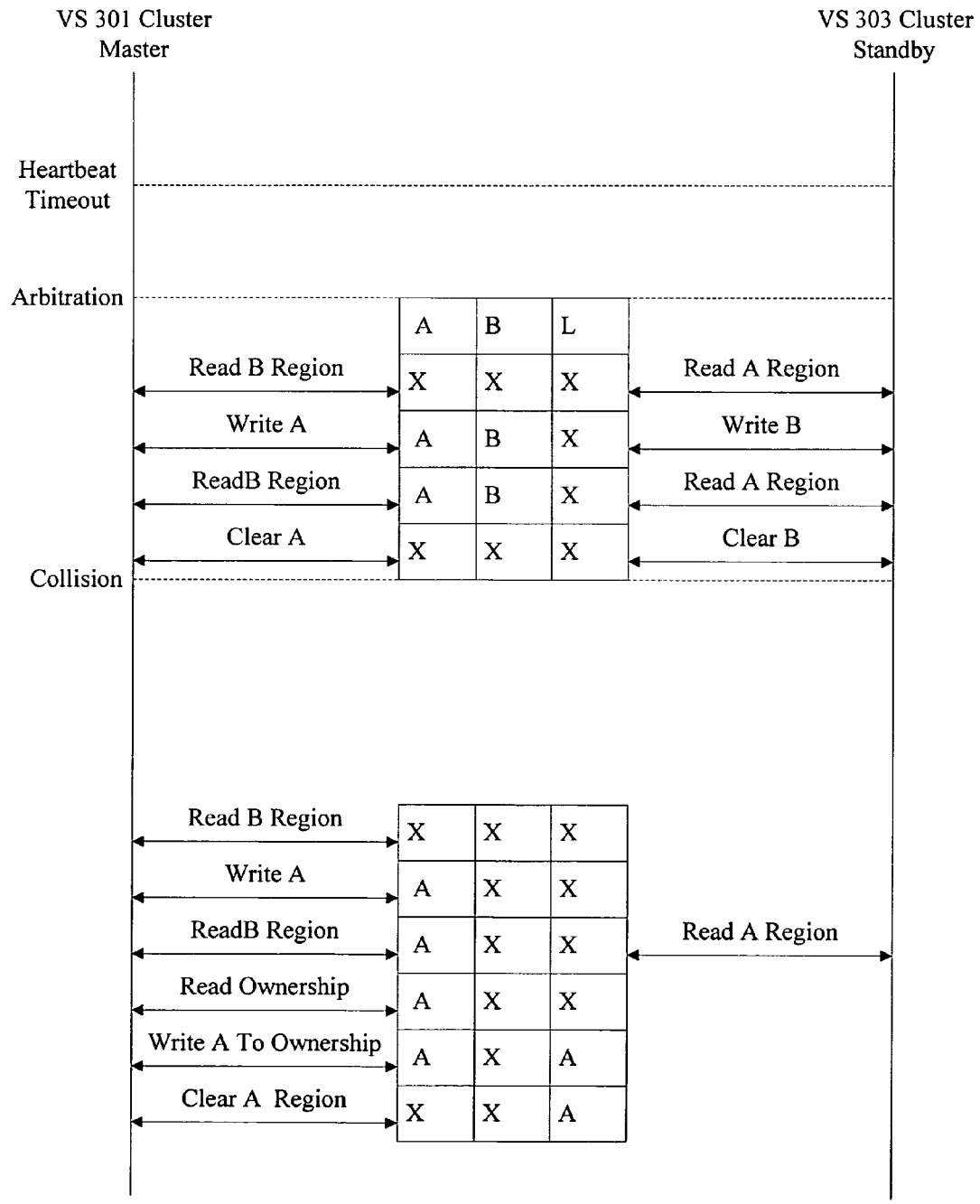
FIG. 3 is an exchange diagram showing an arbitration mechanism in the event of a link failure resulting in bi-directional heartbeat loss.

There is a possibility that both the VLUN Servers participating in the protocol reach step (2.d.). This is a collision and both the VLUN Servers back-off and try again. The random wait ensures against repeated FIG. 3 is an exchange diagram showing of an arbitration mechanism in the event of a link failure resulting in bi-directional heartbeat loss. VS 301 is the cluster master and VS 303 is the cluster standby before the link failure. Alternatively VS 301 and VS 303 are virtualization service high availability modules. Block A is the write region of VS 301 and block B is the write region for VS 303. The Ownership block L is the region for writing ownership of the service-group. X represents a clear value, A represents the ID of VS 301 and B represents the ID of VS 303. According to various embodiments, the initial round of arbitration results in a collision. Both VS 301 and 303 then wait for a random amount of time before attempting arbitration again. The second round of arbitration results in VS 301 establishing ownership of the service-group.

On boot-up, the virtualization service high availability (VSHA) module performs the arbitration for each service-group in order to determine its state. If it is successful in obtaining exclusive access to the Ownership block, it checks the region for its own ID or X. In either case it can move to the standalone master state for the service-group. In any other case it moves to the isolated state for the service-group. The arbitration mechanism described above also solves the case of uni-directional heartbeat loss. In order to handle uni-directional heartbeat loss, a wait time needs to be introduced after winning the arbitration. The winner of the arbitration does not declare itself the winner until after the arbitration wait time. During this period the winner does not send any heartbeats. This period is long enough (taking into consideration n/w latency) to force the peer VSHA module into arbitration. Since a uni-directional heartbeat loss cannot be distinguished from a bi-directional heartbeat loss, this wait time will have to be introduced for every arbitration winner.

Figure 4:
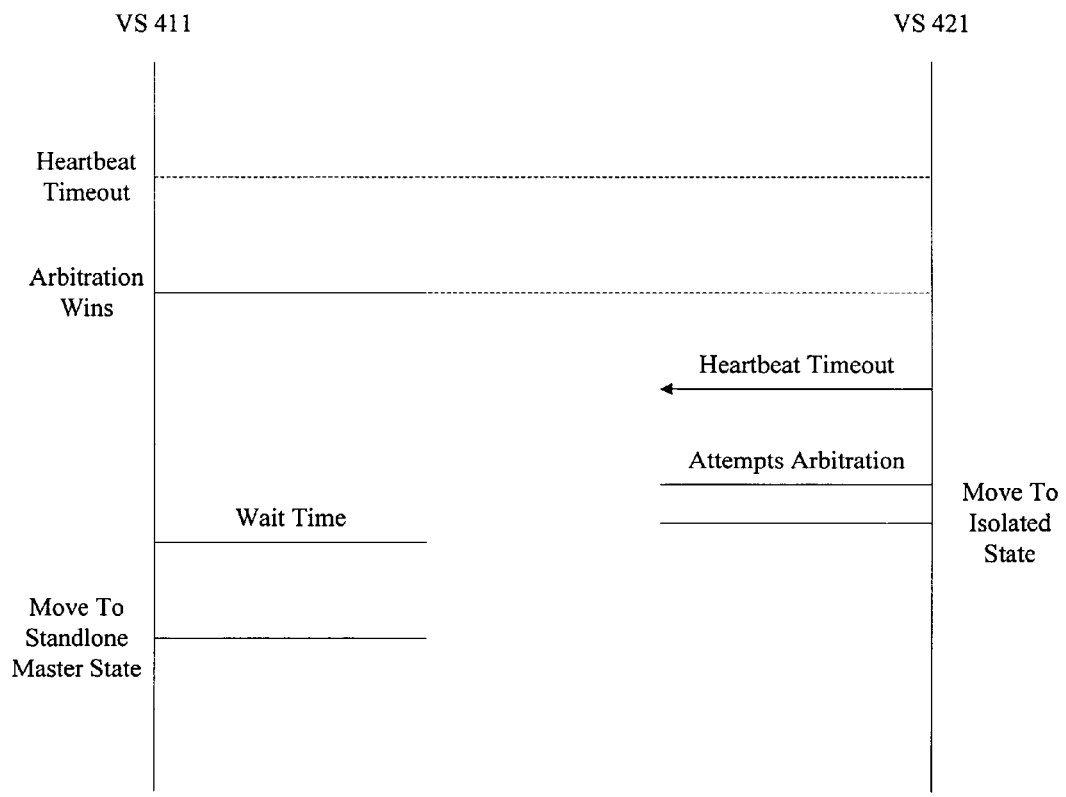
FIG. 4 is a diagrammatic representation showing where only one VS is receiving heartbeats.

FIG. 4 is a diagrammatic representation showing an example where only one VS is receiving heartbeats. According to various embodiments, VS 421 is receiving heartbeats but VS 411 is not. VS 411 will time-out and VS 421 will perform arbitration. VS 411 wins the arbitration. VS 421 does not detect a time-out until the VS 411 stops sending heartbeats. During the wait period, VS 411 does not send any heartbeat messages. VS 421 eventually times-out and performs arbitration. Since the VS 411 detected the heartbeat time-out first, it wins the arbitration.

The actions performed by each node after winning or losing the arbitration are described in the following table.

TABLE 2

Actions after Arbitration

| Result of Arbitration | Action of Original Cluster Master | Action of Original Cluster Standby |
|---|---|---|
| Original Cluster Master wins the Arbitration | 1. Waits for Arbitration wait time<br>2. Moves to Standalone Master state for the service-group | Moves to Isolated state for the service-group. |
| Original Cluster Standby wins the Arbitration | 1. Waits for Arbitration wait time<br>2. Waits for I/O drain timeout<br>3. Waits for Deport time<br>4. Imports Disk-groups<br>5. Moves to Standalone Master state for the service-group | 1. Revoke Delegation<br>2. Drain outstanding I/O's<br>3. Deport the disk-groups<br>4. Move to Isolated state for the service-group |

Figure 5:
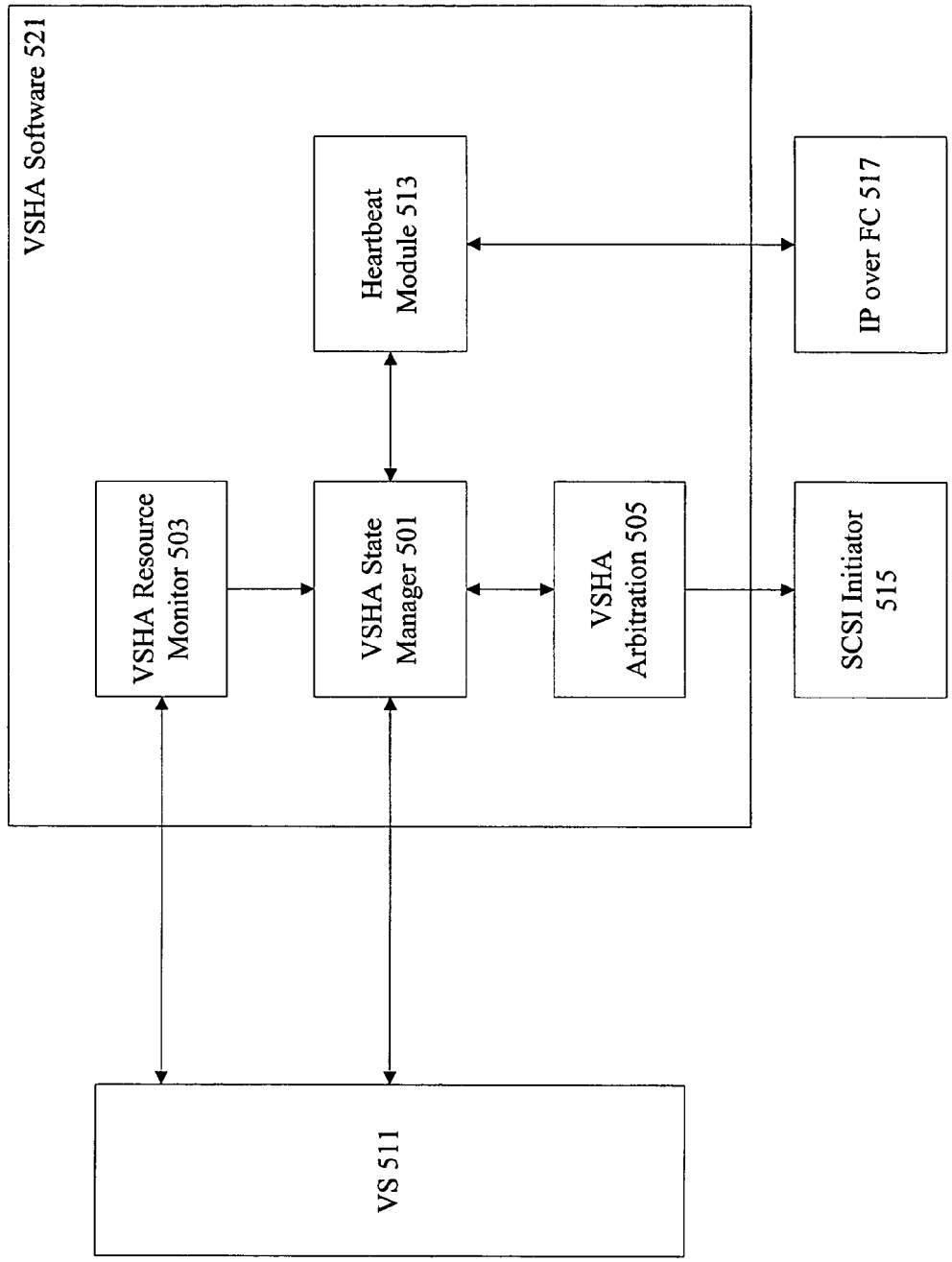
FIG. 5 is a diagrammatic representation showing VLUN server high availability (VSHA) software.

FIG. 5 is a diagrammatic representation showing one example of VLUN server high availability (VSHA) software. The VSHA software 521 includes a VSHA state manager 501, resource monitor 503, heartbeat module 513, and arbitration module 505. The state manager 501 performs a variety of functions including providing synchronization of configuration information such as service groups and disk-group composition of service groups, providing the interface to configure service groups and VS redundancy, providing disk-group import/deport during fail-over, allowing interaction with the heartbeat module 513 and the resource monitor 503 to determine the current state of the VSHA for each service group. The state manager 501 also triggers the arbitration mechanism to determine if failover is needed on heartbeat timeout.

The VS redundancy state manager 501 interacts with the VS 511 to obtain information that needs to be synchronized between the active and the standby VS and to start the import or deport of diskgroups. The VSHA state manager starts the heartbeat for each service group. It also interacts with the heartbeat module 513 to determine the next state. The VSHA state manager 501 interacts with the resource monitor 503 to determine the availability of the diskgroups to the VS. On an active VS for a service group, the VSHA state manager 501 periodically invokes the resource monitor 503 to monitor disk-group health from the VS. When the heartbeat module 513 detects a network partition, it invokes the VSHA state manager 501 to perform either arbitration or resource fencing using arbitration module 505 to ensure that a single Active VS exists for a service-group at any given time.

The heartbeat module 513 implements the heartbeat mechanism between the Active and Standby VS. The heartbeat messages are sent over IP over FC 517. A timeout in receiving heartbeats implies a possible node failure or link failure. Module 513 is responsible for triggering the actions that need to be performed at the time of fail-over. An extension of the virtual router redundancy protocol (VRRP) can be used to implement heartbeats for VS redundancy.

The heartbeat module 513 interacts with the following modules. The heartbeat module 513 interacts with the VSHA state manager 501 to inform the manager of the IP address of the other node (active/standby) for the service group, heartbeat time-outs and change in state from active to standby or vice-versa. The heartbeat module 513 interacts with the IP-FC interface 517 to provide the virtual IP address to virtual MAC address mapping.

The resource monitor 503 is used to monitor the disk-groups. On detection of failure of disk-group due to factors such as loss of connectivity from VS to disk-group, disk failure etc., it will interact with the VSHA state manager 501 to initiate fail-over. The detection of failure is done by the VS. The resource monitor 503 uses the existing VS infrastructure to determine disk-group availability. The failure of a disk-group is communicated from the VS to the resource monitor 503. The resource monitor 503 interacts with the VSHA state manager 501 to obtain the service group to disk-group mapping. The resource monitor 503 interacts with the state manager 501 module to ensure that a resource failure results in a fail-over from the active VS to the standby VS if deemed necessary. Once the VS has imported a disk-group, the VSHA state manager 501 starts the resource monitoring for that disk-group.

The arbitration module 505 handles the split brain scenario to provide data integrity in case of connectivity loss between active and standby devices. According to various embodiments, the arbitration module 505 does not fence off a VS. The arbitration module 505 initiates arbitration when there is a heartbeat failure. The arbitration module 505 also performs a SCSI reserve and release on the physical disk.

The heartbeat functionality and IP address takeover for VSHA can be implemented using a mechanism such as the Virtual Router Redundancy Protocol (VRRP) augmented to support specific mechanisms in storage area networks. VRRP is described in RFC2338 and is used to implement a virtual router to support redundancy and load sharing. VRRP specifies an election protocol that dynamically assigns responsibility for a virtual router to one of the VRRP routers on a LAN. The election process provides dynamic fail over in the forwarding responsibility should the Master become unavailable. From the perspective of VLUN Server Redundancy, VRRP provides the mechanism for IP address takeover by the standby VS. This infrastructure can be used to build the rest of the VS redundancy mechanism. In order to provide failover at the service group (or disk group) level, a separate instance of the VRRP process would be used per service group (or disk group). This is because each instance of the VRRP process has associated with it a VR-ID and failover occurs per VR-ID.

Figure 6:
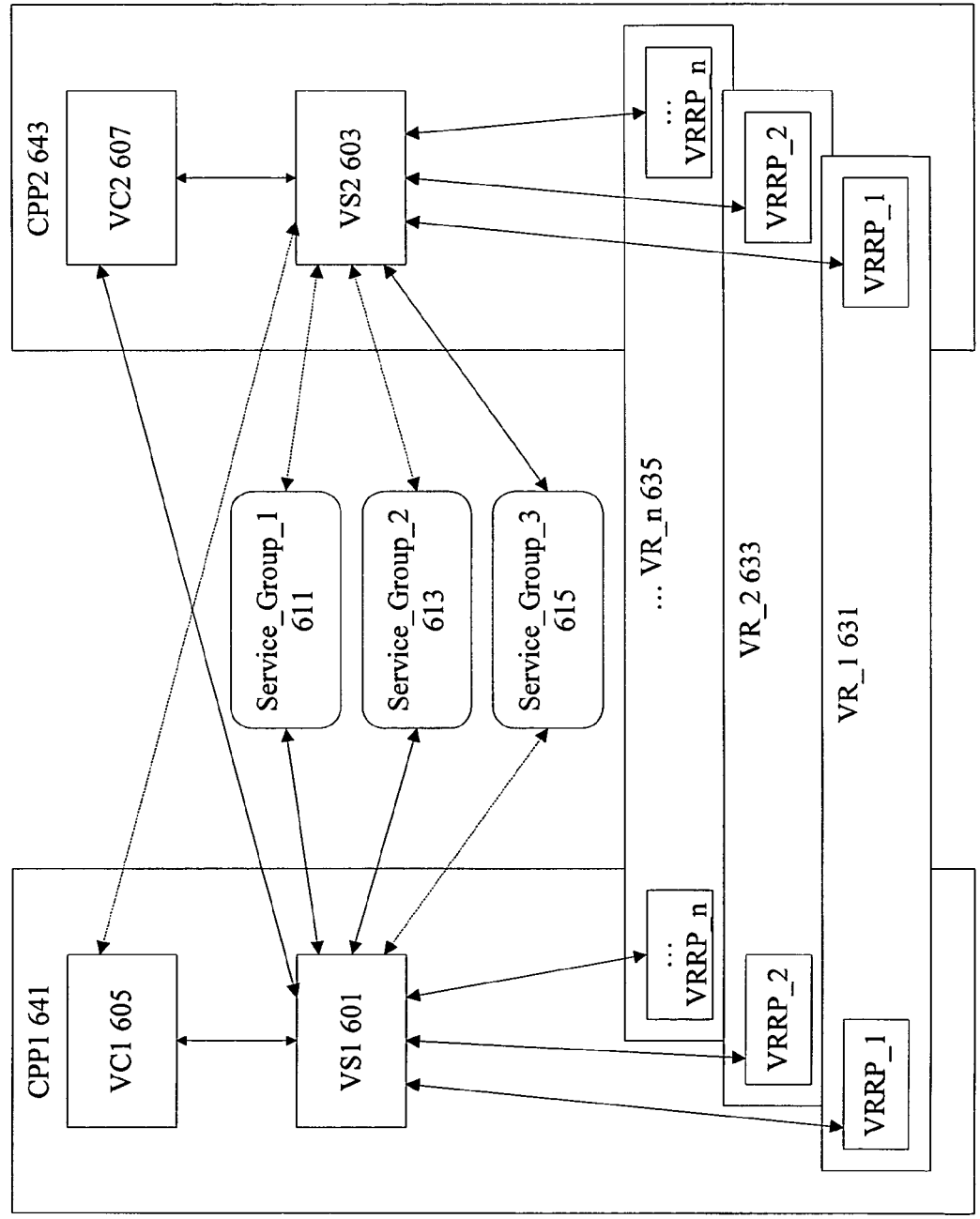
FIG. 6 is a diagrammatic representation showing VRRP for VSHA.

FIG. 6 is a diagrammatic representation showing one example of VRRP for VSHA. In the case of VS redundancy each service group 611, 613, and 615 would be associated with a VR-ID. Control plane processor 641 would include VC 605 and VS 601 and links to VR 631, VR 633, and VR 635. Control plane processor 643 would include VC 607 and VS 603 and links to VR 631, VR 633, and VR 635. This allows the situation wherein a VS is currently the owner of multiple VRRP groups and is capable of failing over a particular VR-ID while continuing to service the other groups as the owner of the corresponding VR-ID's. VRRP specifies that the owner (priority 255) of the virtual router own the VR_IP, when on-line or available. But in the case of VS redundancy, the current owner of the virtual IP address continues to own the IP address and hence the disk-groups associated with that IP address until the next failover occurs. There is no requirement for the disk-groups to failback to the previous active VS when that VS comes back on-line. A VS assumes ownership of the resources only if it is configured to do so or due to a failover.

VRRP provides IP address failover. There are no provisions in the protocol for failover of resources such as disk groups or fencing other nodes in the cluster etc. VRRP also does not require any state synchronization mechanism between the Master and Backup(s). The Backup is configured for a particular VR-ID. On failover it takes over all the IP addresses associated with that VR-ID. No other state information is required for the failover. VS redundancy on the other hand needs to synchronize service group information between the active and standby VS. The synchronization of service group configuration information across the active and standby VS is handled by the VSHA manager. VRRP, on establishing communication with another VR for the same VR_ID, requests the VSHA manager to engage in the handshake protocol to exchange state information.

According to various embodiments, VR-ID is a 8-bit field as defined in RFC2338. Each virtual IP address has associated with it a virtual MAC address too. The virtual MAC is failed over along with the virtual IP address. But unlike the virtual IP address, the virtual MAC does not need any specific configuration as it is derived from the VR-ID. The format of the MAC address is 00-00-5E-00-01-VR_ID. This format places the restriction of 255 VRRP instances in the Fabric, per VSAN. Although it is possible to map multiple virtual IP addresses to the same virtual MAC, we want the failover to be on a per service group basis. Each service group would therefore be a separate instance of VRRP with its own IP and MAC address, failing over independently of another VRRP group that the VS is a part of. The support for multiple virtual MAC addresses is provided in the IPFC driver. Since the VRRP process manages the heartbeats and the send and receive timers, in order to ensure that the VRRP process is not starved of CPU scheduling, it is assumed that all kernel code conforms to using the CPU in small chunks.

However, modifications need to be made to the standard VRRP in order to support VS Redundancy using VRRP. In VRRP, the equivalent of heartbeat for a High-Availability cluster, are the advertisements exchanged for a particular VR-ID. This advertisement is sent by the Master VR to the standby VRs. However, in the case of VS Redundancy, there is a need to have bidirectional heartbeat between the active and the standby VS. This is used to allow both the active and the standby VS to detect loss of communication. This would allow the active and the standby VS to participate in a protocol that ensures data integrity in the event of a network partition.

In the VSHA model, fail back is not allowed. That is, once an active VS dies, the standby takes over and continues to be in control even though the original active VS comes online. In order to achieve this, the current active VS continues to send advertisements with priority 255. VRRP ensures that the VR with priority 255, when on-line, is always the owner of the VR-ID. However for VS redundancy, a node should never automatically assume ownership of a virtual IP address except at the time it is configured to do so. In other words, when VRRP for a particular VR-ID is initialized on a node, it assumes ownership of the associated VR-IP if it is configured as the master. However on reboot, it does not automatically become the owner.

Figure 7:
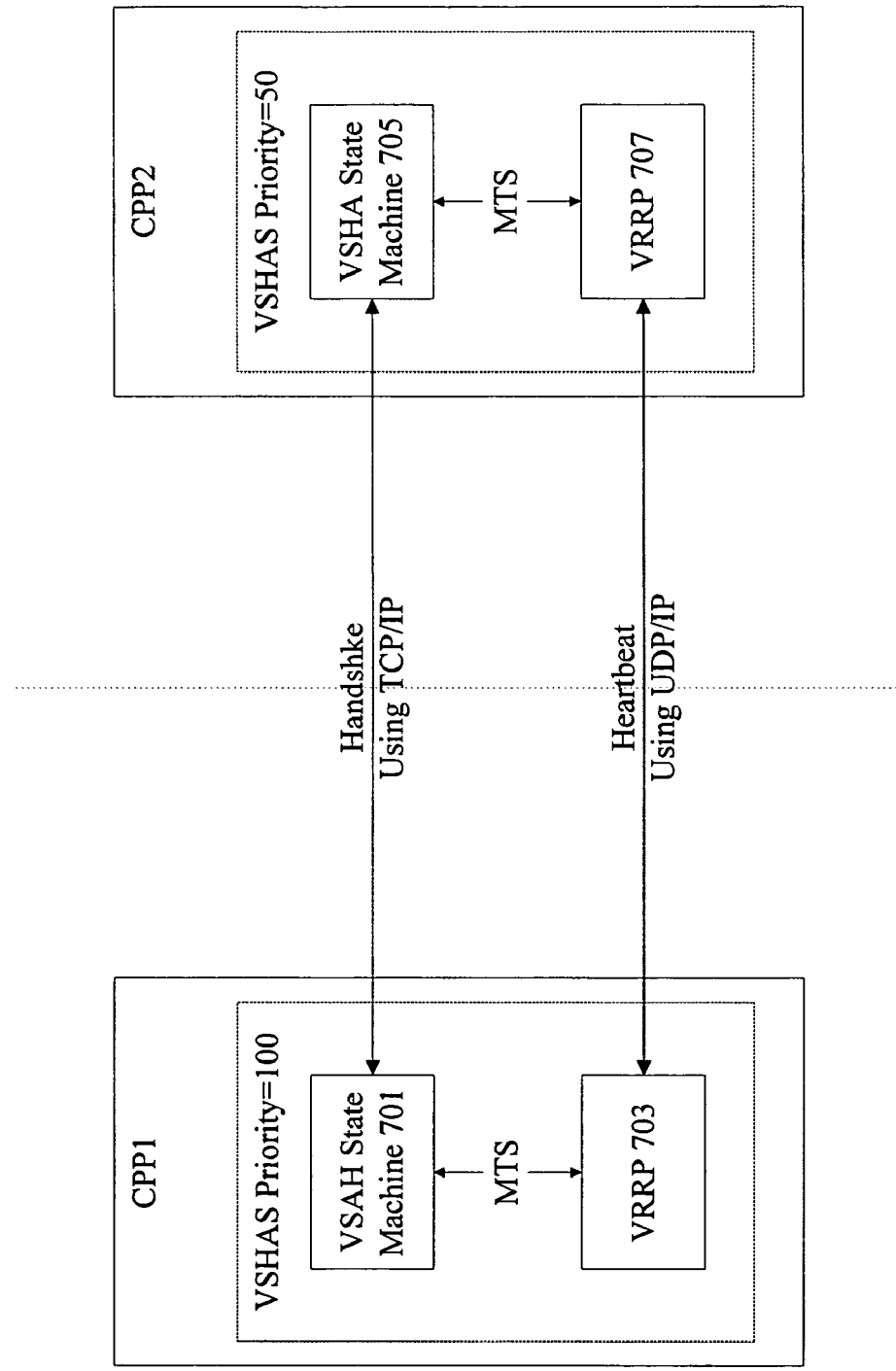
FIG. 7 is a diagrammatic representation showing interactions between a VSHA state machine and VRRP.

FIG. 7 is a diagrammatic representation showing interactions between a VSHA state machine and VRRP. The VSHA Software includes two processes, the VSHA processes 701 and 705 and the VRRP Process 703 and 707. The VSHA State manager may also need to force VRRP to give up ownership of the Virtual IP address and move to standby state. Hooks into the VRRP process would be used to start/stop the same. For example, if the resource monitor determines that the active VS has lost one or more disks in the disk group, it would need to inform the corresponding VRRP process to give up the IP address and send out a zero priority advertisement. This trigger hook would be used in VRRP. Since there are multiple VRRP processes on the same entity (VS) the identifying factor for the process would be the VR_ID.

Furthermore, the VRRP process interacts with the VSHA state manager to provide arbitration support to handle network partitions. During a change of state, the decision to transition to the new state is based on the success or failure of the handshake for state information exchange, provided by the VSHA state manager.

Figure 8:
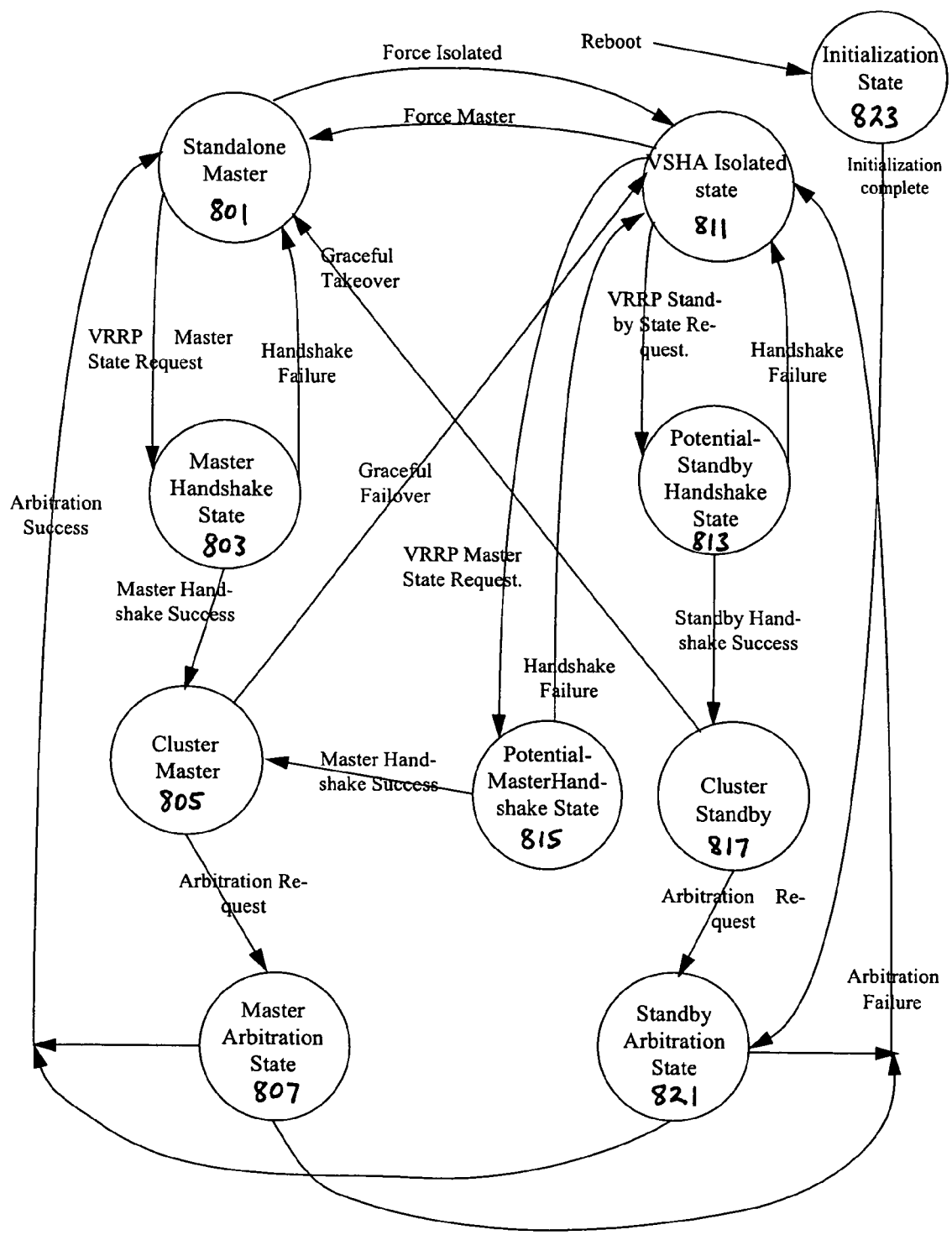
FIG. 8 is a VSHA software state diagram.

FIG. 8 is a one example of a VSHA software state diagram. According to various embodiments, the VSHA software has a number of states. When VSHA is started for the first time or after a crash, it enters the initialization state 823. In this state, the VSHA module reads the service-group configuration information from the configuration file. For each disk-group in the service-group, it checks to see if the disk-group is imported. If the disk-group is imported, VSHA requests to deport the disk-group. It then requests VRRP to stop sending heartbeat messages for the corresponding VR_ID. Once this clean up operation is complete, VSHA transitions to the standby Arbitration state 821 for the service-group.

VSHA is said to be in the standalone Master state 801 when it owns the service group and the associated virtual IP address, but does not have any backup VS configured/available for the service group. In this case there is no high availability for this service group associated with the standalone VSHAS. VSHAS can enter this state under several conditions including on configuration as Master, after a failover due to heartbeat timeout, and on initialization/reboot.

VSHA is said to be in the Isolated state 811 when it is configured as the backup for a particular virtual IP address and service group but has no master VS configured/available for the same resources. In this case, the backup cannot try to acquire the resources and become the master until it has established communication with an active VS. This state is similar to a blocked state where communication with an unblocked cluster member proceeds. A VS in this state doesn't service the VLUNs in the service group. VSHA can enter this state under several conditions including setting by a user, after a failover due to heartbeat timeout, and on initialization/reboot.

VSHA enters the Master Handshake State 803 when the VRRP process for the service group requests a transition to the Cluster Master State 805. This state can only be entered from the Standalone Master State 801. The request implies that communication has been established for the first time between a standalone master and an isolated node for the same service group. In this state the VSHA software needs to synchronize the service-group information with the peer node. If the synchronization of state information completes successfully, the handshake is complete. Otherwise the handshake is a failure and VSHA returns to the Standalone Master state 801 for that service group. If the handshake is complete, VSHA transitions to the Cluster Master state 805. In the Master Handshake State 803, the VS continues to service the disk-groups it was controlling in the Standalone Master State 801.

VSHA enters the Potential-Master Handshake State 815 when the VRRP process for the service group requests a transition to the Cluster Master State 805. This state is entered from the VSHA Isolated state 811. The request implies that communication has been established for the first time between two VSHA Isolated state nodes and this node should become Master of the Cluster because it has a greater VRRP priority than the peer node. In this state the VSHA software needs to synchronize the service-group information with the peer node. If the synchronization of state information completes successfully the handshake is complete. Otherwise the and VSHA returns to the Isolated state 811 for that service group. If the handshake is complete, VSHA transitions to the Cluster Master state 805.

VSHA enters the Potential-Standby Handshake State 815 when the VRRP process for the service group requests a transition to the Cluster Standby State. This state can only be entered from the VSHA Isolated state 811. The request implies that communication has been established for the first time between two VSHA Isolated state nodes and this node should become Standby of the Cluster because it has a lower VRRP priority than the peer node. In this state the VSHA software needs to synchronize the service-group information with the peer node. If the synchronization of state information completes successfully the handshake is complete. Otherwise the Handshake is a failure and VSHA returns to the Isolated state 811 for that service group. If the handshake is complete, VSHA transitions to the Cluster Standby state 817.

VSHA is said to be in the Cluster Master state 805 when it is the owner of the designated service group and its associated IP address and it is sending/receiving heartbeats from another VS configured as the backup for that service group. This is the preferred state where a backup is available to take over from the Master VS in the case of a failure. (node failure or link failure). VSHA can enter this state from the Standalone Master state 801 on handshake with a isolated state node and from the Isolated state 811 on handshake with another isolated state node.

VSHA is said to be in the Cluster Standby state 817 when it is the backup of the designated service group and its associated IP address and it is sending/receiving heartbeats from another VS configured as the current Master for that service group. This is the preferred state where this backup is available to take over from the Master VS in the case of a failure. (node failure or link failure). VSHA can move to this state only from the isolated state on establishing communication with a standalone master.

VSHA enters the Cluster Master state 805 or the Cluster Standby state 817 when one VS in the Cluster times-out based on heartbeat messages. In this state the VSHA software on the VS attempts to reserve the arbitration disk for the service-group. On successful reservation of the arbitration disk, the reservation is held for a pre-determined amount of time to ensure that the other VS had had sufficient time to attempt to reserve the same arbitration disk and back-off on receiving a reservation conflict. On releasing the reservation, VSHA moves to the Standalone Master state 801 for the service-group. If the VS times-out without making the reservation or receives a conflict on reservation, it implies that it has lost the arbitration and proceeds to the VSHA Isolated state 811. The distinction in behavior between the Master Arbitration State 807 and the Standby Arbitration state 821 is that in the Master Arbitration state 807, the VS continues to service the diskgroups it was controlling in the Cluster Master State unless it loses the arbitration and has to transition to the Isolated state 811.

According to various embodiments, every VS starts on reboot in the Isolated state 811 for every instance of VSHAS. This implies that after a network partition, although the volumes are still on-line, there is no VS High availability for the affected service groups. Moreover if a VS failure is followed by a link failure before the VS reboots, then the rebooting VS cannot provide back up for the current master until the link is restored.

A variety of events can cause state transitions. The Initialization Complete event marks the completion of the initialization process. Any imported disk-groups in the service-group are deported. VRRP process for the corresponding VR_ID is stopped. VSHA transitions to the Standby Arbitration State 821 to determine ownership of the service-group.

The Force Master event occurs when the user configures VSHAS, currently in the isolated state, to run as Master for a specific service group. VSHAS moves to the Standalone Master mode as it is unaware of the existence of any Backup and hence does not attempt to timeout the standby. The Force Isolated event occurs when the users configures VSHAS, currently in the Standalone Master state, to transition to the Isolated State for a specific service group.

The VRRP software sends and receives heartbeats on a per service group basis at regular intervals. The heartbeat messages from the other VS in the cluster are an indication that the other VS is alive. When the heartbeat message from another VS is received for the first time VRRP needs to determine based on priorities if a state transition is specified. VRRP compares its priority with that of the sending node. If the local priority is lower than the senders priority, VRRP sends VSHA a Standby State Request. VSHA performs a Handshake with the peer node and informs VRRP whether it should transition to the Standby State or remain in its existing state. The request causes VSHA to move to the Potential-Standby Handshake state depending on the current state of VSHA.

The VRRP software sends and receives heartbeats on a per service group basis at regular intervals. The heartbeat messages from the other VS in the cluster are an indication that the other VS is alive. When the heartbeat message from another VS is received for the first time VRRP needs to determine based on priorities if a state transition may be required. VRRP compares its priority with that of the sending node. If the local priority is higher than the senders priority, VRRP sends VSHA a Master State Request. VSHA performs a Handshake with the peer node and informs VRRP whether it should transition to the Master State or remain in its existing state. The request causes VSHA to move to the Master-Handshake State or the Potential-Master Handshake state depending on the current state of VSHA.

The Handshake Failure event occurs from the handshake state when the synchronization of state information between the two nodes establishing communication for the first time, does not complete successfully. The transition results in VSHA returning to the state it was in, before it entered the handshake state. The Standby Handshake Success event occurs if the handshake involving state synchronization completes successfully. The transition allows VSHA to move to the Cluster Standby state. The Master Handshake Success event occurs if the handshake involving state synchronization completes successfully. This transition allows VSHA to move to the Cluster Master state. The arbitration request event occurs whenever VRRP detects a heartbeat time-out with the peer node in the cluster.

The Arbitration Success event implies that one of the Participants in the arbitration has successfully reserved the disk. The transition in this case is to the Standalone Master state. The Arbitration Failure event implies that one of the Participants in the arbitration has failed to reserve the disk. The transition in this case is to the Isolated state. The Graceful Fail-over event occurs when the current Cluster Master decides to relinquish Master status and has released all resources, informing the Cluster Standby to take-over as Master for the service group. The transition results in VSHA moving from the Cluster Master state to the Isolated state. VSHA informs the Cluster Standby to take-over the service group by sending a zero priority VRRP advertisement. The Graceful Take-over transition occurs when the Cluster Standby receives a message from the Cluster Master to take over as the Active VS for the service group. The transition results in VSHA moving to the Standalone Master state from the Cluster standby 817 state. VRRP on receiving the zero priority message from the Cluster Master, informs VSHA that it needs to transition to Cluster Master State.

The reboot event allows VSHA to enter the initialization state 823 for each service-group. After performing the clean-up operations to ensure that no disk-groups are imported, it moves to the Standby Arbitration state 821. In this state VSHA determines if it is the owner of the service group. If it cannot establish ownership through arbitration it moves to the Isolated state mode. It remains in this state until it establishes communication with another isolated state node or a standalone Master. In one example, VS1 and VS2 are in the stable cluster state. VS1 is the cluster master and VS2 is the cluster standby 817. If VS1 fails, VS2 moves to the arbitration state and wins the arbitration. VS2 is now in the standalone master state. Assume that there is a link failure between VS1 and VS2 before VS1 reboots. When VS1 reboots, it cannot determine ownership and moves to the Isolated state 811.

In another example, VS1 is cluster Master and VS2 is Cluster standby 817 and there is a system-wide power failure. If before the power is restored the link between VS1 and VS2 fails, then on reboot, both VS1 and VS2 remain in the isolated state 811 until the link is repaired. Both are capable of taking over as the active VS for the service group but are unable to communicate with each other. As a result the service group remains offline. This would qualify as a double failure (Link failure and VS failure).

According to various embodiments, the VSHA state manager is responsible for synchronizing the configuration information across the active and standby VS for a given service group. The VSHA state manager maintains a list of service groups along with the real IP address of the active and standby VS for each service group. The VSHA manager of the active VS for a service group is responsible for sending the service group configuration information to the standby VS. In some examples, the information sent across from the active VS to the standby VS includes the following:

Service-group names.

Disk-group names—List of all the disk-groups that are a part of the above service group.

VR-ID—Identifies the VRRP process associated with the service group.

VR_IP—The virtual IP address associated with the service group.

State Sequence number—Provides a timestamp for the configuration information associated with the service group.

Arbitration Disk ID—Identifies the arbitration disk to be used for arbitration of service group ownership.

Configuration status—Fresh or stale to indicate if an update on the configuration failed before completion.

Synchronization of state information occurs when the two VLUN Servers establish a handshake for the first time or when there is a change in the configuration of the disk-groups at the active VS. When two VLUN Servers establish a handshake for the first time, the handshake protocol needs to determine which one of the two VLUN Servers has the most recent copy of the configuration state for the service-group. The sequence number in the state information acts a timestamp.

Figure 9:
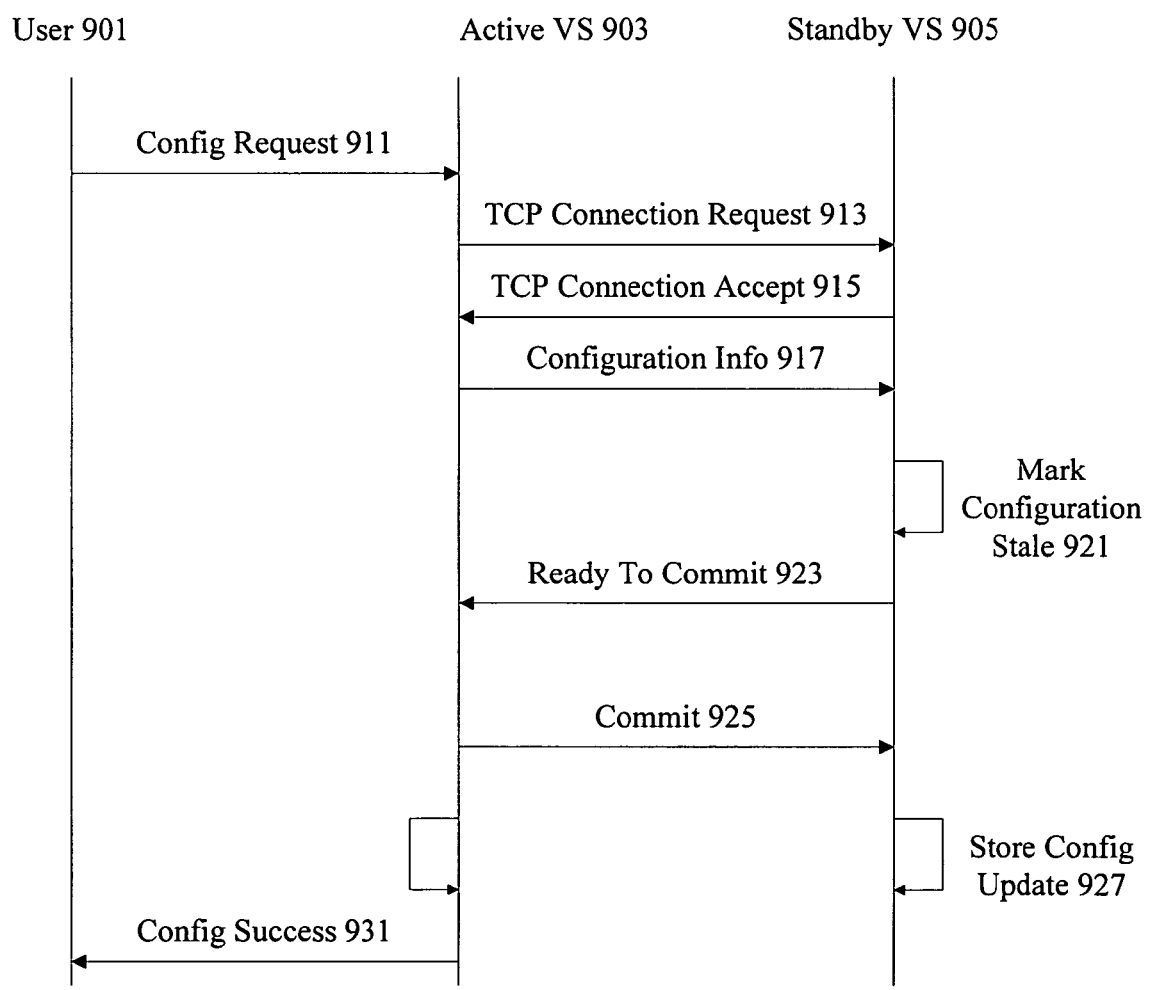
FIG. 9 is an exchange diagram showing configuration change synchronization.

FIG. 9 is an exchange diagram showing one example of configuration change synchronization. In one embodiment, state synchronization occurs because of a configuration change. In one example, a user configuration is modified using a mechanisms such as a command line interface. The configuration request 911 is relayed to VSHA on the active VS. If the service-group under consideration for configuration changes does not have redundancy configured, the active VS updates the Configuration information for the service group and responds with a configuration Update Success. In case of redundancy the active VS proceed to initiate a TCP connection 913 to the standby VS for the service group. If the connection cannot be established and the active VS times-out, the new configuration is rejected. The standby VS sends an accept 915 back to the active VS TCP stack. The VSHA on VS1 sends the new configuration 917 to VS2. The configuration information exchange for the active-standby is modeled using the Two-Phase commit protocol. The VSHA on VS2 checks the configuration and marks the configuration for the service group locally available as stale 921. The VSHA on VS2 sends to VS1, the Ready-to-Commit 923 for the new configuration information. The VSHA on VS1 checks the information sent and returns a commit 925 to VS2. Each VS updates the configuration information 927 in persistent storage. VS2 removes the stale mark for the service group information. The active VS informs the user of successful update of the configuration by sending a configuration success message 931 for the service group.

The configuration change synchronization scheme ensures that in the case of a time-out, the active VS is always able to make a decision regarding the state of the service group configuration. But the standby VS may be blocked until it can confirm the state information from the active VS for the service group.

Figure 10:
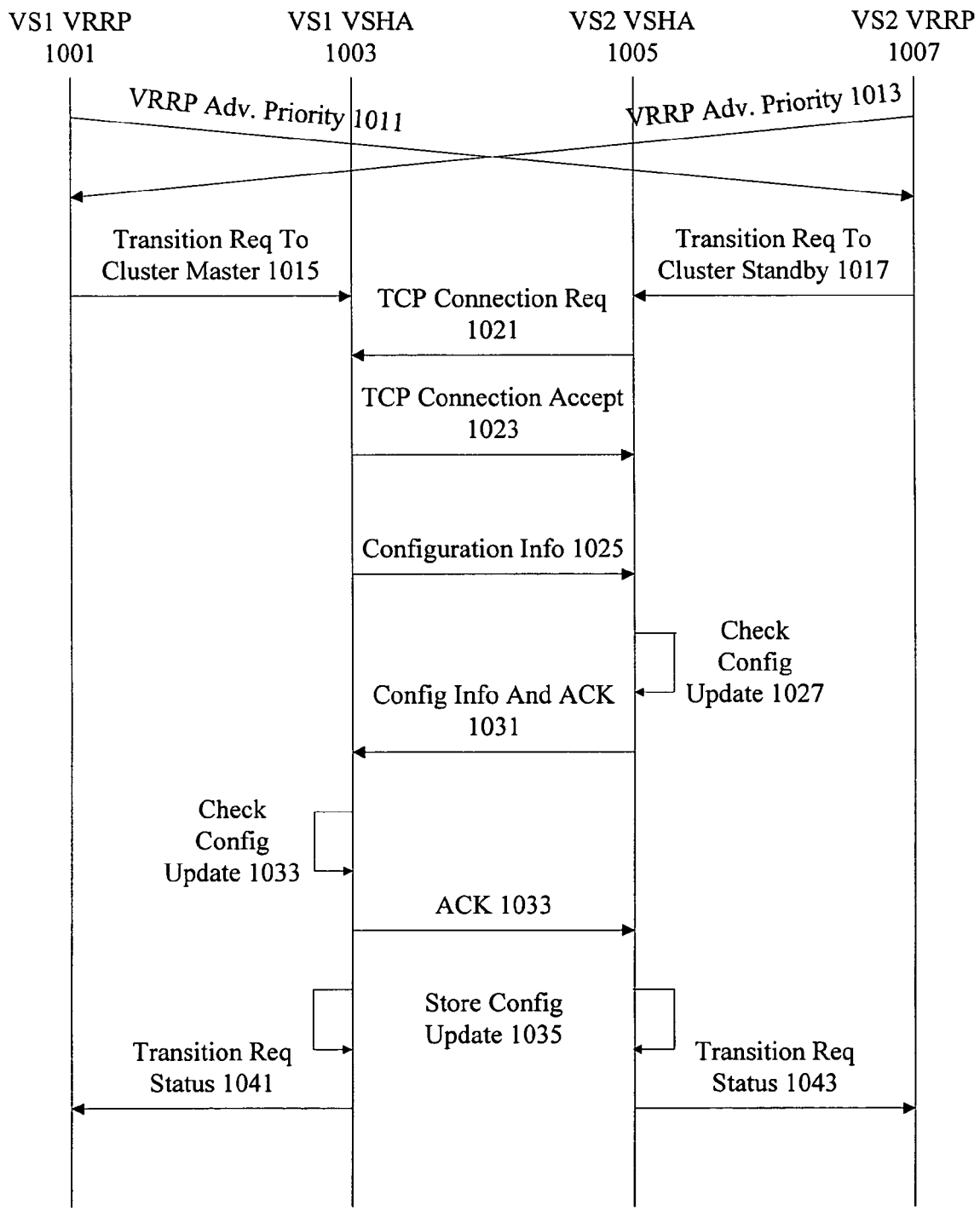
FIG. 10 is an exchange diagram showing initial state synchronization between the active VLUN Server and the Standby VLUN Server.

FIG. 10 is an exchange diagram showing one example of initial state synchronization between the active VLUN Server and the Standby VLUN Server. According to various embodiments, the active and standby Status is decided by VRRP based on the priorities of the VRRP process. Either both the VLUN Servers are booting up and need to establish communication with another VS for the service group or a single VS may be booting up with another VS already servicing the virtual IP address for the service group. VS1 and VS2 send out advertisements 1011 and 1013 including the VR_ID and the priority. The VRRP process on VS figures out that it has higher priority than the remote VS. The VRRP process on VS2 figures out that its priority is lower than the remote process. VRRP decides to transition VS1 to the Cluster Master state for that service group. VRRP decides to transition VS2 to the Cluster Standby state.

The transition requests 1015 and 1017 are relayed to VSHA by each VS. Based on success or failure of the handshake, the transition may be accepted or rejected. If rejected VRRP continues as it did before the remote VS advertisement was received for the specific VR_ID. The standby VS initiates a TCP connection 1021 to the Active VS for the service group. If the connection cannot be established and the active VS times-out the new configuration is rejected. The active VS sends an accept 1023 back to the standby VS TCP stack. The VSHA on VS1 sends the service group configuration information 1025 to VS2. The VSHA on VS2 checks the configuration sequence number to determine whether the configuration is up to date at 1027. If VSHA on VS2 has marked its information as stale then it does not perform the check. The VSHA on VS2 sends VS1 an acknowledgment 1031 for the new configuration or more recent configuration information that it already has.

The VSHA on VS1 checks the information sent to determine if it is an acknowledgment for the configuration or more recent configuration information that it needs to update at 1033. The VSHA on VS1 sends an ACK 1033 to VS2 to acknowledge the receipt of the ACK/Configuration update. Each VS updates the configuration information at 1035 in persistent storage if necessary. VSHAs on each VS inform VRRP of the result of handshake at 1041 and 1043. VRRP transitions to the desired state based on the handshake result.

The Handshake between the two VLUN Servers is said to be successful only if both the VLUN Servers receive each-others VRRP advertisements and the three-way state synchronization is completed successfully. The various failures that may occur during the state synchronization process are discussed below.

The variety of failure scenarios can occur. Some errors occur in state exchange during normal operation. In one example, the active VS is unable to establish a TCP connection to the standby VS. The active VS rejects the configuration to the user and continues as the Master with the old service group configuration. There is no state change and the active VS continues in the Cluster Master state. In another example, the Active VS times-out/loses connection with the standby VS after sending across the configuration. In this case the active VS once again rejects the configuration to the user and continues as Cluster Master with the old service group configuration. If the decision was based on a time-out then the TCP connection with the standby VS is torn down in order to indicate to the standby that the exchange has failed. In yet another example, the Standby VS loses connection to the active VS before responding to the configuration information received. The standby VS ignores the configuration and continues as the Cluster Standby with the old configuration for the service group. In still another example, the Standby VS times-out/loses connection with the active VS after sending across its ready-to-commit but before it receives the ACK from the active VS. The standby VS marks configuration as stale and transitions to the isolated state, trying to establish communication with the active VS again to refresh configuration. The standalone state ensures that it does not attempt to become Master until its configuration is updated.

Errors can also occur during state exchange with both VLUN Servers booting up. A variety of circumstances can occur. The Lower Priority VS is unable to establish a TCP connection to the VS with Higher priority. The higher priority VS times-out/loses connection with the lower priority VS after sending across the configuration. The lower priority VS times-out waiting for a connection from the higher priority VS. The lower priority VS loses connection to the higher priority VS before responding to the configuration information received. The lower priority VS loses connection to the higher priority VS after responding to the configuration information received but before receiving the ACK from the higher priority VS. In all the above cases, VSHA in the respective VS informs VRRP to continue in the isolated state and not transition to the Cluster Master or Cluster Standby state. This is because if the two VLUN Servers are unable to complete the handshake it is equivalent to a VS configured for redundancy (for a particular service group), booting with a per-existing network partition.

Errors can also occur during state exchange with one VS booting up, while another one is active. In one instance, the Standby VS is unable to establish a TCP connection to the active VS. The active VS continues in the standalone master state. The standby VS continues in the isolated state. Attempt to establish connection with a active VS for the service group is postponed until the next VRRP advertisement is received. In another instance, the Active VS times-out/loses connection with the standby VS after sending across the configuration. If the active VS times-out the TCP connection with the standby VS, it first tears down the TCP connection to indicate to the standby VS that the handshake has failed. It then continues in the standalone master state. In two other examples, the Standby VS loses connection to the active VS before responding to the configuration information received or the lower priority VS loses connection to the higher priority VS after responding to the configuration information received but before receiving the ACK from the Active VS. In the above two cases, VSHA in the booting VS informs VRRP to continue in the isolated state and not transition to the Cluster Standby state.

Figure 11:
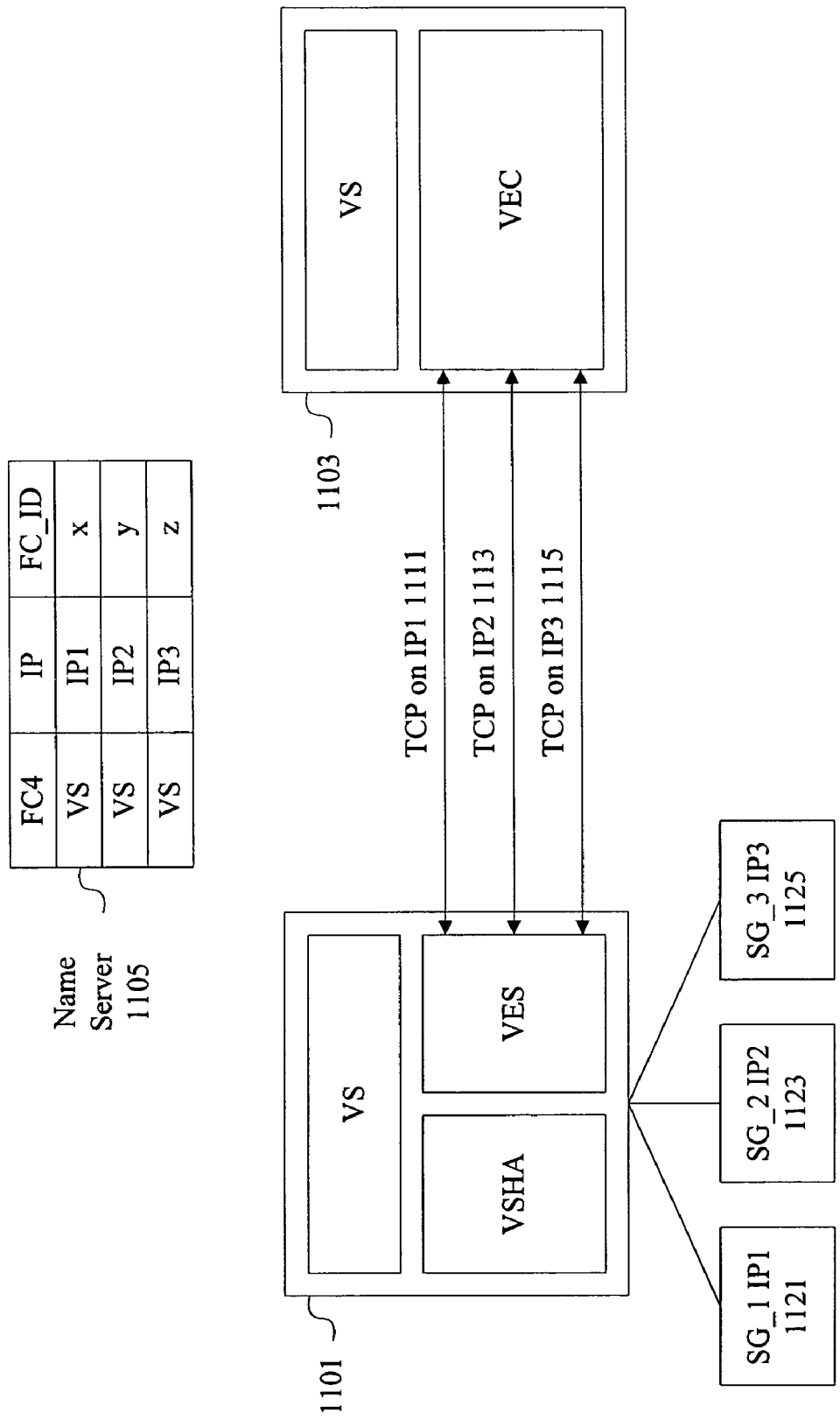
FIG. 11 is a diagrammatic representation showing a VC coupled to a VS operating three service groups.
Figure 12:
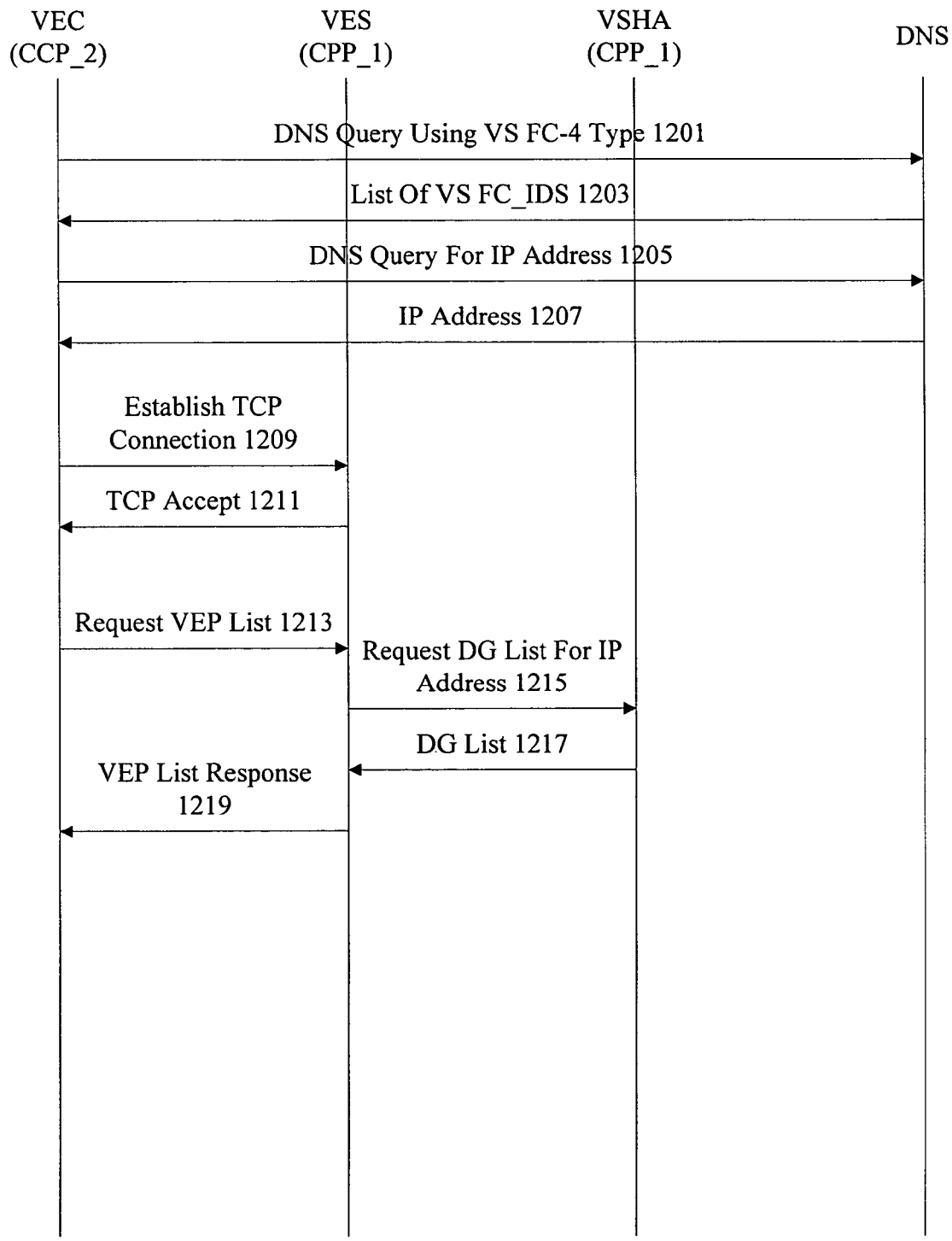
FIG. 12 is an exchange diagram showing the interaction of the VEC with the name server and VES.
Figure 13:
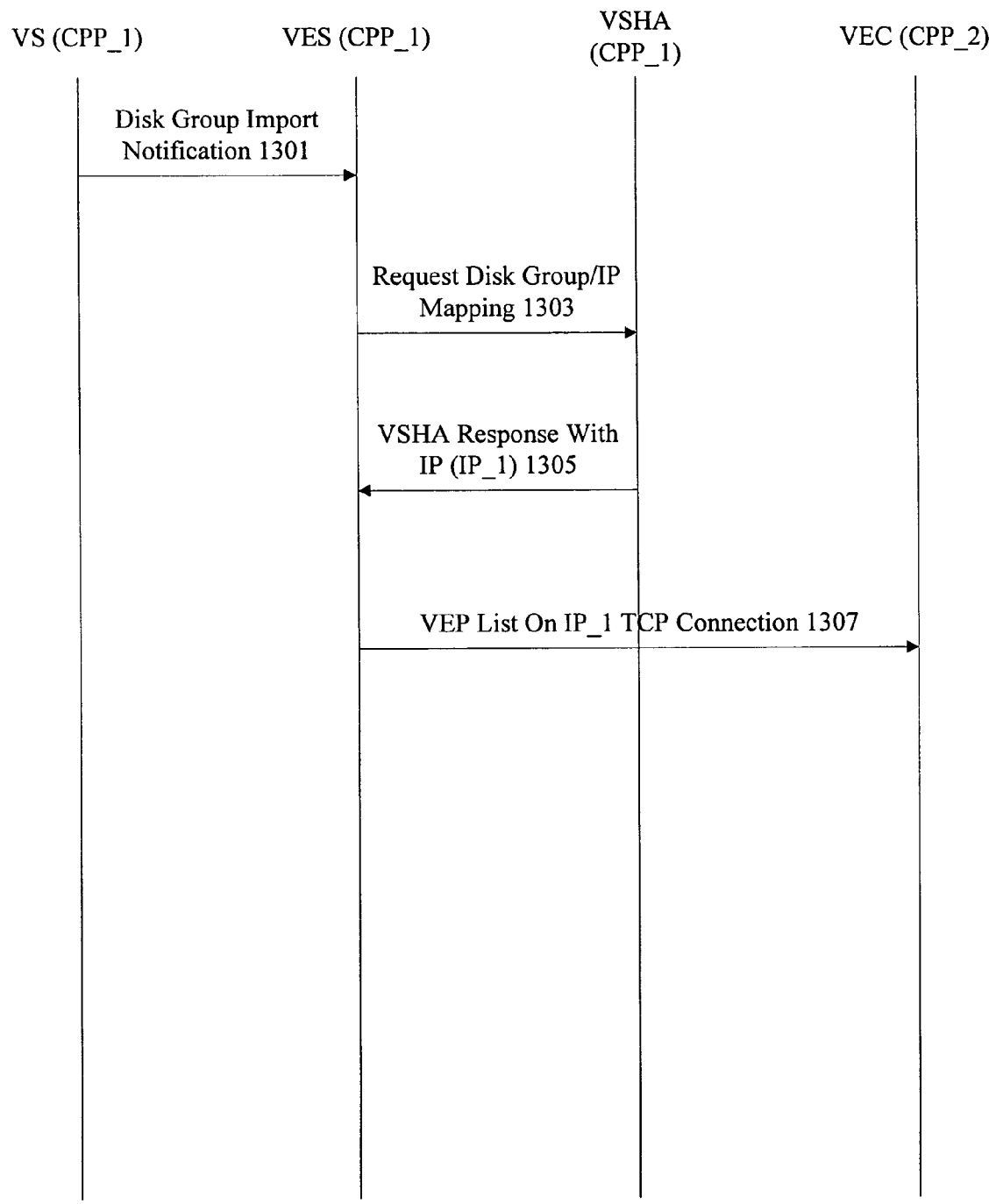
FIG. 13 is an exchange diagram showing VS and VC interaction when a disk-group is imported.

FIG. 11 is a diagrammatic representation showing a VC coupled to a VS operating three service groups. VS 1101 controls three service groups SG_1 1121, SG_2 1123, and SG_3 1125 with three IP addresses IP1, IP2 and IP3 respectively. The VS 1101 registers each IP address with the Name Server 1105. A VLUN enclosure client (VEC) 1103 needs to connect to the VLUN enclosure server (VES) on the line card of the VS 1101 controlling the service groups. Although FIGS. 11-13 show VES and VEC, it should be noted that VES and VEC are used in a specific application of the techniques of the present invention. According to various embodiments, VES and VEC are not used. A VEC 1103 can have multiple TCP connections 1111, 1113, and 115 to the same VES if the corresponding VS controls multiple servicegroups.

FIG. 12 is an exchange diagram showing the interaction of the VEC with the name server and VES. VEC discovery of VES in the IP domain is a part of the VC boot-up sequence. On Boot up a VEC queries the name server for all VSs at 1201. During a service group creation, a VS registers the IP address<--->FC_ID pair with the name server. This query returns to the VEC the port_id of all the VS entries in the name server at 1203. The VEC then queries for the IP addresses corresponding to the port_ids for all name server entries that had a IP associated with it at 1205. A single VS may have multiple entries in the name server, one for each service group that it controls. From the point of view of the VEC, it does not recognize the distribution of IP addresses across the VSs. The Name Server replies with the list of IP addresses at 1207.

The VEC connects to all the IP addresses at 1209. Effectively it may be connected to a single VS over multiple TCP/IP connections. The VES accepts the TCP connection at 1211. The VEC requests the VES for the list of VEPs that it needs to trap at 1213. The VES queries the VSHA for the list of disk groups associated with a virtual IP address at 1215. VSHA provides the list of disk groups to the VES at 1217. The VES then informs the VEC over a particular IP connection, the corresponding VEPs it needs to trap at 1219. Whenever a new service group is created, the VS controlling the service group is assigned a new virtual IP address. An IPFC N-port is created for the IP address and a FC_ID is assigned. This FC_ID and IP address are registered with the DNS. The VECs register for RSCNs. When a new N-port is inserted into dNS, the VECs receive an RSCN. If the RSCN is for a new VS IP address, the VEC should establish a TCP connection with the VS on the new IP address.

A VEC has multiple connections to the same VS because each VEC connects to all the IP addresses registered with dNS. On each connection the VS informs the VC of the VLUNs that can be exported from the disk-groups associated with that particular IP address. The IP address<-->Service Group<-->Disk Group mapping is provided by the VSHA to the VS. When a VEC loses a TCP/IP connection with a VS, it enters a reconnect loop where it attempts to reconnect to the VS continuously until successful FIG. 13 is an exchange diagram showing VS and VC interaction when a disk-group is imported. At 1301, the VS on CPP_1 imports a disk-group. The VES on CPP_1 needs to be notified of this disk-group import so that it can read the virtual enclosure database for the disk-group from the well-known private volume. At 1303, the VES needs to inform the VEC's of the VEP list for the imported disk-group. But this information should be sent to the VEC on the TCP connection on the IP address of the service-group which the disk-group belongs. The VES requests the VSHA module for this IP address. At 1305, the VSHA responds with the Disk-group to IP address mapping assigned in this example as IP_1. AT 1307, the VES sends the VEP list to the VEC's connected to it on IP_1

Figure 14B:
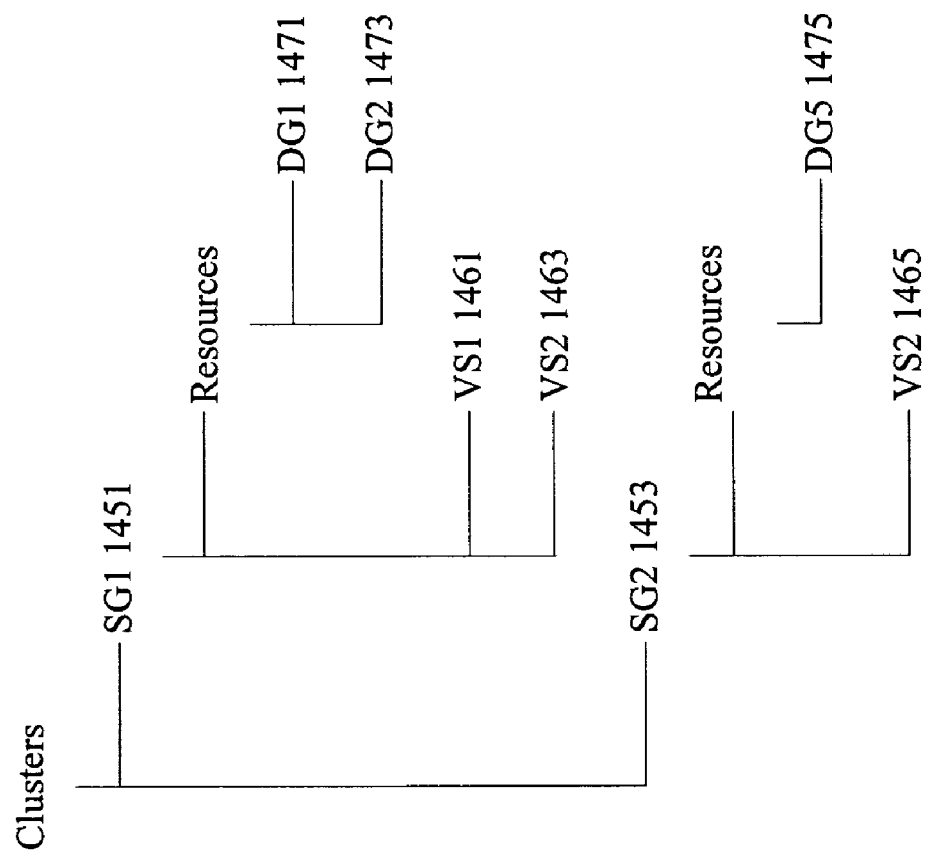

FIGS. 14a and 14b are diagrammatic representations showing configuration of service-groups. The administrative domain AD 1401 has under it two VLUN Servers, VS1 1403 and VS2 1405. VS1 has imported three disk-groups, DG1 1411, DG2 1413 and DG3 1415. VS2 1405 has imported two disk-groups, DG4 1417 and DG5 1419. Some of these disk-groups may be part of a redundant service-group and other may not. In the cluster configuration, there are two Clusters, SG1 1451 and SG2 1453. SG1 1451 includes two VLUN Servers, VS1 1461 and VS2 1463. VS1 1461 is the active VS and VS2 1463 is the standby VS. The resources of SG1 include DG1 1471 and DG2 1473. This implies that DG1 1471 and DG2 1473 imported by VS1 1461 are part of the redundant service-group SG1 1415. SG2 1453 has only one VS, namely VS2 1465. It has only one resource DG5 1475. DG5 1475 although part of a redundant service-group is not highly available until another VS is added to the cluster SG2 1453.

VLUN server high availability can be implemented on a variety of devices. For example, the high availability mechanisms of the present invention can be implemented on an MDS 9000 series device available from Cisco System of Santa Clara, Calif. However, it should be noted that a wide variety of switch and router configurations are available.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method for providing high availability at a virtual logical unit number server (VS), the method comprising:

detecting a heartbeat timeout between a first VS and a second VS in a service-group cluster, the first VS having a first VS write region, the second VS having a second VS write region, and the first VS and the second VS sharing an ownership region;

writing an identifier associated with the first VS into a first VS write region when it is determined that the second VS write region is clear;

wherein the writing the first VS write region is triggered upon detecting a the heartbeat timeout at a the first VS;

writing the ownership region when it is determined that the ownership region is clear;

operating the first VS as the standalone master VS upon writing the ownership region; and wherein the second VS operates in the isolated state upon operating the first VS as the standalone master VS.

2. The method of claim 1, wherein the first VS is a storage area network switch.

3. The method of claim 1, wherein the first VS and the second VS are associated with a single storage area network switch.

4. The method of claim 1, wherein a mechanism associated with the heartbeat timeout is Virtual Router Redundancy Protocol (VRRP).

5. The method of claim 1, wherein the service group includes a plurality of disk groups.

6. The method of claim 1, wherein the first VS is included in multiple service groups.

7. The method of claim 1, wherein the first VS operates in a network having multiple overlapping clusters.

8. The method of claim 1, wherein the first VS operates in a network having a service group.

9. The method of claim 8, wherein the service group is a group of resource made highly available by the first VS.

10. A system for providing high availability, the system comprising:

means for detecting a heartbeat timeout between a first virtual logical unit number server (VS) and a second VS in a service-group cluster, the first VS having a first VS write region, the second VS having a second VS write region, and the first VS and the second VS sharing an ownership region;

means for writing an identifier associated with the first VS into a first VS write region when it is determined that the second VS write region is clear;

wherein the writing the first VS write region is triggered upon detecting a the heartbeat timeout at a the first VS;

means for writing the ownership region when it is determined that the ownership region is clear;

means for operating the first VS as the standalone master VS upon writing the ownership region; and wherein the second VS operates in the isolated state upon operating the first VS as the standalone master VS.

11. The system of claim 10, wherein the first VS is a storage area network switch.

12. The system of claim 10, wherein the first VS and the second VS are associated with a single storage area network switch.

13. The system of claim 10, wherein a mechanism associated with the heartbeat timeout is Virtual Router Redundancy Protocol (VRRP).

14. The system of claim 10, wherein the service group includes a plurality of disk groups.

* * * * *